(12) United States Patent
Kanba et al.

(10) Patent No.: US 7,056,986 B2
(45) Date of Patent: Jun. 6, 2006

(54) ETHYLENE-ACRYLIC COPOLYMER RUBBER COMPOSITION

(75) Inventors: Yasuhiro Kanba, Niigata (JP); Yasushi Abe, Niigata (JP); Shogo Hagiwara, Chiba (JP); Masao Koga, Chiba (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/834,348

(22) Filed: Apr. 29, 2004

(65) Prior Publication Data

US 2004/0266922 A1 Dec. 30, 2004

Related U.S. Application Data

(63) Continuation of application No. PCT/JP02/11309, filed on Oct. 30, 2002.

(30) Foreign Application Priority Data

Oct. 30, 2001 (JP) .............................. 2001-332121
Jul. 25, 2002 (JP) .............................. 2002-216624

(51) Int. Cl.
*C08F 8/32* (2006.01)

(52) U.S. Cl. .................. 525/329.5; 525/374; 525/379; 525/382; 524/236; 524/556

(58) Field of Classification Search ................ 524/236, 524/556; 525/329.7, 329.9
See application file for complete search history.

(56) References Cited

U.S. PATENT DOCUMENTS

| | | | | |
|---|---|---|---|---|
| 4,429,068 A | * | 1/1984 | Nakahira | 524/302 |
| 4,912,186 A | * | 3/1990 | Ohhara et al. | 526/323 |
| 5,115,006 A | * | 5/1992 | Watanabe et al. | 524/251 |
| 6,353,054 B1 | * | 3/2002 | Wang et al. | 525/66 |
| 6,407,179 B1 | * | 6/2002 | Hagiwara et al. | 525/330.3 |
| 2001/0005742 A1 | | 6/2001 | Moriyama et al. | |
| 2002/0037970 A1 | * | 3/2002 | Moriyama et al. | 525/330.3 |

FOREIGN PATENT DOCUMENTS

| | | |
|---|---|---|
| JP | 50-45031 | 4/1975 |
| JP | 11-140264 | 5/1999 |
| JP | 11-269336 | 10/1999 |
| JP | 2001 181356 | 7/2001 |
| JP | 2002 265737 | 9/2002 |
| JP | 2002 317091 | 10/2002 |
| WO | WO-02/072697 | 9/2002 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

An ethylene-acrylic copolymer rubber composition, which comprises (A) a carboxyl group-containing ethylene-acrylic copolymer rubber, (B) at least one monoamine compound selected from the group consisting of a primary amine, a secondary amine and a tertiary amine, (C) a guanidine type compound, and (D) at least one of an aromatic diamine compound expressed by the following structural formula (1),

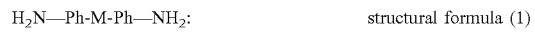

$H_2N$—Ph-M-Ph—$NH_2$:  structural formula (1)

wherein M is O, S, $SO_2$, CONH, or O—R—O in which R is Ph, Ph—Ph, Ph—$SO_2$—Ph, $(CH_2)m$, $(CH_2)C(CH_3)_2(CH_2)$, or Ph—$C(CX_3)_2$—Ph, and m=3–5, X=H or F and Ph=benzene ring.

19 Claims, No Drawings

ETHYLENE-ACRYLIC COPOLYMER RUBBER COMPOSITION

This application is a continuation of PCT/JP02/11309 filed Oct. 30, 2002.

TECHNICAL FIELD

The present invention relates to an ethylene-acrylic copolymer rubber composition having a satisfactory vulcanizability and an excellent balance between processability and compression set.

BACKGROUND ART

JP-A-50-45031 discloses an elastomer composition obtained by blending hexamethylenediamine or hexamethylenediamine carbamate, 4,4'-methylenedianiline and the like as a vulcanizer and a vulcanization accelerator with an acrylate-butenedionic acid monoester bipolymer or an ethylene-acrylate-butenedionic acid monoester terpolymer. Also, JP-A-11-140264 discloses an acrylic elastomer composition having a diamine compound vulcanization accelerator, a guanidine compound vulcanization accelerator and a benzolylsulfene amide type compound vulcanization accelerator blended, and also discloses that they are excellent in scorch stability and compression set.

Also, JP-A-11-269336 discloses an acrylic elastomer composition having mercaptobenzimidazoles, guanidines and a diamine compound blended, and also discloses that they are excellent in compression set.

However, although an elastomer composition having a diamine compound such as hexamethylenediamine or hexamethylenediamine carbamate blended as a vulcanizer has an excellent compression set, a scorch time is short and a processing stability is poor, and it is therefore not practical as a molding material for a hose and a packing or gasket material. Also, when 4,4'-methylenedianiline or 4,4'-diaminodiphenyl ether and di-O-tolylguanidine are used as a vulcanizer, a scorch time is long but a roll processability is quite poor and there is a problem that a roll operation can not be made.

DISCLOSURE OF THE INVENTION

The present invention solves the above problems and provides an acrylic rubber composition having a satisfactory vulcanizing property and an excellent balance between processability and compression set. In order to solve the above-mentioned problems, the present inventors have intensively studied and have discovered that an acrylic rubber composition excellent in processability and compression set can be obtained by combining (A) a carboxyl group-containing acrylic elastomer, (B) a monoamine compound, (C) a guanidine compound and (D) a specific diamine compound, and consequently the present invention has been accomplished.

Thus, the present invention resides in an ethylene-acrylic copolymer rubber composition comprising (A) a carboxyl group-containing ethylene-acrylic copolymer rubber, (B) at least one monoamine compound selected from the group consisting of a primary amine, a secondary amine and a tertiary amine, (C) a guanidine type compound, and (D) at least one of an aromatic diamine compound expressed by the following structural formula (1), and its vulcanized material,

 structural formula (1):

wherein M is O, S, SO$_2$, CONH or O—R—O in which R is Ph, Ph—Ph, Ph—SO$_2$—Ph, (CH$_2$)$_m$, (CH$_2$)C(CH$_3$)$_2$(CH$_2$), or Ph—C(CX$_3$)$_2$—Ph, and m=3–5, X=H or F, and Ph=benzene ring.

BEST MODE FOR CARRYING OUT THE INVENTION

Hereinafter, the present invention is explained in more details.

The carboxyl group-containing ethylene-acrylic copolymer rubber of the present invention is an ethylene-acrylic copolymer rubber obtained by copolymerizing at least one or two or more monomers selected from the group consisting of (a) an unsaturated carboxylic acid such as acrylic acid and methacrylic acid, (b) an aliphatic unsaturated dicarboxylic acid such as maleic acid, fumaric acid, itaconic acid and citraconic acid, and (c) an aliphatic unsaturated dicarboxylic acid monoester such as monomethyl maleate, monoethyl maleate, mono-n-propyl maleate, monoisopropyl maleate, mono-n-butyl maleate, monoisobutyl maleate, monomethyl fumarate, monoethyl fumarate, mono-n-propyl fumarate, monoisopropyl maleate, mono-n-butyl fumarate, monomethyl itaconate, monoethyl itaconate, mono-n-propyl itaconate, mono-n-propyl citraconate, mono-n-butyl citraconate and monoisobutyl citraconate, as a carboxylic group-containing unsaturated aliphatic acid, in an amount of about 0.1 to 30 mass % in the polymer.

The carboxyl group-containing ethylene-acrylic copolymer rubber of the present invention is preferably obtained by copolymerizing the above carboxyl group-containing unsaturated aliphatic acid and an unsaturated monomer such as an acrylic acid alkyl ester.

Examples of the acrylic acid alkyl ester include methyl acrylate, ethyl acrylate, n-propyl acrylate, isobutyl acrylate, n-butyl acrylate, n-pentyl acrylate, n-hexyl acrylate, n-octyl acrylate, 2-ethylhexyl acrylate, and the like.

Further, examples of other copolymerizable acrylic acid alkyl esters include n-decyl acrylate, n-dodecyl acrylate, n-octadecyl acrylate, cyanomethyl acrylate, 1-cyanoethyl acrylate, 2-cyanoethyl acrylate, 1-cyanopropyl acrylate, 2-cyanopropyl acrylate, 3-cyanopropyl acrylate, 4-cyanobutyl acrylate, 6-cyanohexyl acrylate, 2-ethyl-6-cyanohexyl acrylate, 8-cyanooctyl acrylate, and the like.

Also, examples of other copolymerizable acrylic acid alkyl esters include acrylic acid alkoxy alkyl esters such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy) propyl acrylate, 2-(n-butoxy)propyl acrylate, and the like.

Further, examples of other copolymerizable acrylic acid alkyl esters include fluorine-containing acryl esters such as 1,1-dihydroperfluoroethyl (meth)acrylate, 1,1-dihydroperfluoropropyl (meth)acrylate, 1,1,5-trihydroperfluorohexyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate, 1,1-dihydroperfluorodecyl (meth)acrylate, and the like, hydroxyl group-containing acrylic acid esters such as 1-hydroxypropyl (meth)acrylate, 2-hydroxypropyl (meth)acrylate, hydroxyethyl (meth)acrylate and the like, tertiary amino group-containing acrylic acid esters such as diethylaminoethyl (meth)acrylate, dibutylaminoethyl (meth)acrylate and the like, and methacrylates such as methyl methacrylate, octyl methacrylate and the like.

Examples of copolymerizable monomers contained for forming the ethylene-acrylic copolymer rubber include alkyl vinyl ketones such as methyl vinyl ketone, vinyl and allyl ethers such as vinyl ethyl ether and allyl methyl ether, vinyl aromatic compounds such as styrene, α-methylstyrene, chlorostyrene, vinyltoluene and vinylnaphthalene, vinylnitriles such as acrylonitrile and methacrylonitrile, ethylenic unsaturated compounds such as acrylamide, vinyl acetate, ethylene, propylene, butadiene, isoprene, pentadiene, vinyl chloride, vinylidene chloride, vinyl fluoride, vinylidene fluoride, vinyl propionate and alkyl fumarate, and the like.

Also, examples of monomers having a crosslinking site include carboxylic group-containing compounds such as acrylic acid, methacrylic acid, crotonic acid, 2-pentenic acid, maleic acid, fumaric acid and itaconic acid, epoxy group-containing compounds such as glycidyl acrylate, glycidyl methacrylate, allyl glycidyl ether, and methallyl glycidyl ether, active chlorine-containing compounds such as 2-chloroethyl vinyl ether, 2-chloroethyl acrylate, vinylbenzyl chloride, vinyl chloroacetate and allyl chloroacetate, and the like.

The carboxyl group-containing ethylene-acrylic copolymer rubber of the present invention can be produced by copolymerizing the above monomers in accordance with a well known method such as emulsion polymerization, suspension polymerization, solution polymerization or bulk polymerization.

(A) a carboxyl group-containing acrylic rubber of the present invention is combined with vulcanizing system of (B) an amine compound, (C) a guanidine compound and (D) a specific aromatic diamine type compound.

(B) Examples of an amine compound include at least one monoamine compound selected from the group consisting of a primary amine, a secondary amine and a tertiary amine.

Examples of the primary amine compound include methylamine, ethylamine, propylamine, butylamine, pentylamine, hexylamine, heptylamine, octylamine, nonylamine, decylamine, undecylamine, dodecylamine, tetradecylamine, hexadodecylamine, stearylamine, octadecylamine, eicosylamine, methanolamine, ethanolamine, aniline, cyclohexylamine, benzylamine, 2-aminotoluene, 3-aminotoluene, 4-aminotoluene, 2,4-dimethylaniline, 2,3-dimethylaniline, 2,5-dimethylaniline, 2,6-dimethylaniline, 3,4-dimethylaniline, 3,5-dimethylaniline, 2,4,5-trimethylaniline, 2,4,6-trimethylaniline, 3,4,5,6-tetramethylaniline, 2,4,5,6-tetramethylaniline, 2,3,5,6-tetramethylaniline, 2-ethyl-3-hexylaniline, 2-ethyl-4-hexylaniline, 2-ethyl-5-hexylaniline, 2-ethyl-6-hexylaniline, 3-ethyl-4-hexylaniline, 3-ethyl-5-hexylaniline, 3-ethyl-2-hexylaniline, 4-ethyl-2-hexylaniline, 5-ethyl-2-hexylaniline, 6-ethyl-2-hexylaniline, 4-ethyl-3-hexylaniline, 5-ethyl-3-hexylaniline, 3,4,6-triethyltoluene, 2-methoxyaniline, 3-methoxyaniline, 4-methoxyaniline, 2-methoxy-3-methylaniline, 2-methoxy-4-methylaniline, 2-methoxy-5-methylaniline, 2-methoxy-6-methylaniline, 3-methoxy-2-methylaniline, 3-methoxy-4-methylaniline, 3-methoxy-5-methylaniline, 3-methoxy-6-methylaniline, 4-methoxy-2-methylaniline, 4-methoxy-3-methylaniline, 2-ethoxyaniline, 3-ethoxyaniline, 4-ethoxyaniline, 4-methoxy-5-methylaniline, 4-methoxy-6-methylaniline, 2-methoxy-3-ethylaniline, 2-methoxy-4-ethylaniline, 2 -methoxy-5-ethylaniline, 2-methoxy-6-ethylaniline, 3-methoxy-2-ethylaniline, 3-methoxy-4-ethylaniline, 3-methoxy-5-ethylaniline, 3-methoxy-6-ethylaniline, 4-methoxy-2-ethylaniline, 4-methoxy-3-ethylaniline, 2-methoxy-2,3,4-trimethylaniline, 3-methoxy-2,4,5-trimethylaniline, 4-methoxy-2,3,5-trimethylaniline, bis(2-cyanoethyl)amine, and the like.

Examples of the secondary amine compound include dimethylamine, diethylamine, dipropylamine, dibutylamine, dipentylamine, dihexylamine, diheptylamine, dioctylamine, dinonylamine, didecylamine, diundecylamine, didodecylamine, ditetradecylamine, dihexadecylamine, dimethanolamine, diethanolamine, diphenylamine, dicyclohexylamine, nitrosodimethylamine, nitrosodiphenylamine, and the like.

Examples of the tertiary amine compound include trimethylamine, triethylamine, tripropylamine, tributylamine, tripentylamine, trihexylamine, triheptylamine, trioctylamine, trinonylamine, tridecylamine, triundecylamine, tridodecylamine, tritetradecylamine, trihexadodecylamine, tristearylamine, trioctadecylamine, trieicosylamine, trimethanolamine, triethanolamine, triphenylamine, tricyclohexylamine, and the like.

An amount of the above monoamine compound added is preferably from 0.01 to 10 mass parts, more preferably from 0.05 to 2 mass parts, to 100 mass parts of an acrylic rubber. If the amount is less than 0.01 mass part, roll-processability becomes remarkably poor. On the other hand, if the amount exceeds 10 mass parts, vulcanization becomes slow and a satisfactory vulcanized product property is hardly realized.

(C) Examples of a guanidine type compound include guanidine, tetramethylguanidine, dibutylguanidine, diphenylguanidine, di-O-tolylguanidine, and the like, and di-O-tolylguanidine is preferably used.

An amount of the guanidine type compound added is preferably from 0.1 to 10 mass parts, more preferably from 0.5 to 5 mass parts, to 100 mass parts of an acrylic rubber. If the amount is less than 0.1 mass part, a satisfactory vulcanizing reaction is not carried out. On the other hand, if the amount exceeds 10 mass parts, vulcanization excessively proceeds and compression set at a high temperature becomes poor.

(D) Examples of a specific aromatic diamine compound include at least one of compounds of the following structural formula (1).

H$_2$N—Ph-M-Ph—NH$_2$   structural formula (1):

In the above formula (1), M is O, S, SO$_2$, CONH or O—R—O, and R in O—R—O is Ph, Ph—Ph, Ph—SO$_2$—Ph, (CH$_2$)$_m$, (CH$_2$)C(CH$_3$)$_2$(CH$_2$), or Ph—C(CX$_3$)$_2$—Ph, and m=3–5, X=H or F, and Ph represents a benzene ring.

Examples of the compounds of the structural formula (1) include at least one selected from the group consisting of 4,4'-bis(4-aminophenoxy)biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 4,4'-diaminodiphenylsulfone, bis[4-(3-aminophenoxy)phenyl]sulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide and bis[4-(4-aminophenoxy)phenyl]sulfone.

An amount of aromatic diamines added is preferably from 0.01 to 10 mass parts, more preferably from 0.05 to 5 mass parts, to 100 mass parts of an acrylic rubber. If the amount is less than 0.01 mass part, vulcanizability becomes insufficient, and if the amount exceeds 10 mass parts, processing stability becomes poor.

The acrylic rubber composition of the present invention is usable practically by adding a filler, a plasticizer, an anti-aging agent, a stabilizer, a lubricant, a reinforcing agent and the like thereto, molding and vulcanizing, depending on its object.

When using carbon black, silicic acid anhydride, surface-treated calcium carbonate and the like as a filler or a reinforcing agent, it is possible to use a mixture of two or more kinds, depending on rubber physical properties required.

A total amount of these additives added is preferably from 30 to 100 mass parts to 100 mass parts of an acrylic rubber.

With regard to a plasticizer, it is possible to add a plasticizer used for an ordinary rubber. For instance, an ester type plasticizer, an ether type plasticizer such as polyoxyethylene ether, and the like may be illustrated as examples, but the plasticizer is not limited to the above illustrated examples and various plasticizers are usable. An amount of a plasticizer added is up to 50 mass parts to 100 mass parts of an acrylic rubber.

Examples of an anti-aging agent include amine type, imidazole type, carbamic acid metal salt, phenol type, wax and the like, and an amount of the anti-aging agent added is from 0.5 to 10 mass parts to 100 mass parts of an acrylic rubber.

A rubber component in the acrylic rubber composition used in the present invention is mainly an acrylic rubber, but in addition to the acrylic rubber, a natural rubber or a synthetic rubber such as IIR, BR, NBR, HNBR, CR, EPDM, FKM, Q, CSM, CO, ECO, CM, or the like may be contained, if required.

Also, machines for kneading, molding or vulcanizing an acrylic rubber, an acrylic rubber composition and their vulcanized materials used in the present invention may be machines ordinary used in rubber industries.

A product obtained after primary vulcanization only by press-vulcanization, steam-vulcanization or the like may be used. Also, a secondary vulcanization by hot air may further be applied to improve properties such as compression set.

An acrylic rubber, an acrylic rubber composition and their vulcanized products of the present invention are usable as vibration insulators and sealing parts such as a rubber hose, a gasket, a packing and the like. Also, as a rubber hose, they may be used for a transmission oil cooler hose, an engine oil cooler hose, a turbointercooler hose, a turboairduct hose, a power steering hose, a hot air hose, a radiator hose, an oil system or fuel system hose and a drain system hose for a high pressure system of industrial machines or building machines.

Also, examples of sealing parts include an engine head cover gasket, an oil pan gasket, an oil seal, a rip seal packing, an O-ring, a transmission seal gasket, a crankshaft or camshaft seal gasket, a bulb stem, a power steering seal belt cover seal, CVJ and R&P boot materials, and the like.

Also, examples of vibration insulator rubber parts include a damper pulley, a center support cushion, a suspension bush and the like.

Particularly, an acrylic rubber, an acrylic rubber composition and their vulcanized product of the present invention have not only excellent mechanical properties but also excellent cold resistance, oil resistance and heat resistance, and are therefore quite suitably usable for rubber hoses and gaskets for automobiles under recent severe environments.

The structure of a rubber hose may be a single unity hose obtained from the acrylic rubber composition of the present invention or may be a composite hose comprising a combination of the acrylic rubber hose of the present invention and other synthetic rubbers such as fluorine type rubber, fluorine-modified acryl rubber, hydrin rubber, CSM, CR, NBR, HNBR, ethylene-propylene rubber and the like as an inner layer, an intermediate layer or an outer layer, depending on its use.

Also, depending on properties required for a rubber hose, it is possible to use a reinforcing fiber or wire in an intermediate or outermost layer of a rubber hose, as generally often used.

Hereinafter, the present invention is further illustrated in more details with reference to the following Examples, but should not be limited to these Examples.

EXAMPLE

Polymer A

Denka ER-A403 (tradename of carboxyl group-containing ethylene-acrylic rubber, manufactured by Denki Kagaku Kogyo K.K.) was used as polymer A.

Polymer B

VAMAC-G (tradename of carboxyl group-containing ethylene-acrylic rubber, manufactured by Du Pont K.K.) was used as polymer B.

Polymer C

A mixture solution of 5.1 kg of ethyl acrylate, 3.9 kg of n-butyl acrylate, 2.3 kg of methoxyethyl acrylate and 0.5 kg of monobutyl maleate, 17 kg of a 4 wt % aqueous solution of partially saponified polyvinyl alcohol and 22 g of sodium acetate, were charged into a pressure-resistant reactor having an inner volume of 40 liters and the resultant mixture was fully mixed by a stirrer to obtain a uniform suspension. After substituting air at the upper part of the container with nitrogen, the container was maintained at 55° C., and an aqueous solution of t-butyl hydroperoxide was charged under pressure through an inlet to initiate polymerization.

During the reaction, the container temperature was maintained at 55° C., and the reaction was finished after 6 hours. A sodium borate aqueous solution was added to the above obtained polymerization solution to solidify the polymer, which was then dehydrated and dried to obtain a raw rubber. This polymer was used as polymer C.

EXAMPLES and COMPARATIVE EXAMPLES

Ethylene-acrylic copolymer rubber compositions were obtained by blending such compositions as shown in the following Tables 1 and 2 by an eight inch roll, and their properties were evaluated.

Processability was evaluated by roll workability at the time of winding an acrylic rubber composition on a roll. A quite satisfactory case without any roll adhesion was evaluated to be "excellent", a satisfactory case with substantially no roll adhesion was evaluated to be "good", and a poor case with substantial roll adhesion was evaluated to be "poor".

Further, vulcanized products of their vulcanized materials were subjected to physical property tests, and their results are shown in the following Table 1. Test pieces (primary vulcanized materials) were obtained by vulcanizing at 170° C. for 10 minutes by an electrically heating press.

Still further, these vulcanized materials are subjected to heat treatment at 170° C. for 4 hours in a gear oven to obtain test pieces as secondary vulcanized products.

The test pieces of secondary vulcanized products thus obtained were measured in respect of mechanical properties such as a tensile strength, an elongation and the like in accordance with JIS K6251.

A hardness was measured by using a durometer in accordance with JIS K6253.

A compression set test was carried out in accordance with JIS K6262 (testing conditions: 150° C., 70 hours).

Still further, Examples obtained by combining guanidine with hexamethylenediamine carbamate, 4,4-methylenedianiline and 4,4'-diaminodiphenyl ether conventionally used as a vulcanizer and Examples obtained by combining a guanidine compound with hexamethylenediamine carbamate and a monoamine compound were tested in the same manner as above, and their test results are shown as Comparative Examples in the following Table 2.

A Mooney scorch test was carried out by using an L shape rotor in accordance with JIS K6300, and a scorch time (t5) was measured at a test temperature of 125° C.

TABLE 1

|  |  | Example No. | | | | | | | |
| --- | --- | --- | --- | --- | --- | --- | --- | --- | --- |
|  |  | 1 | 2 | 3 | 4 | 5 | 6 | 7 | 8 |
| Blending components |  |  |  |  |  |  |  |  |  |
| Polymer A |  | 100 | 100 | 100 | 100 | 100 | 100 | 100 | 100 |
| Polymer B |  |  |  |  |  |  |  |  |  |
| Polymer C |  |  |  |  |  |  |  |  |  |
| Stearic acid |  | 1 | 1 | 1 | 1 | 1 | 1 | 1 | 1 |
| Anti-aging agent CD |  | 1 | 1 | 1 | 1 | 1 | 1 | 1 | 1 |
| MAF carbon |  | 50 | 50 | 50 | 50 | 50 | 50 | 50 | 50 |
| Liquid paraffin |  | 1 | 1 | 1 | 1 | 1 | 1 | 1 | 1 |
| Paraffin wax 135F |  | 2 | 2 | 2 | 2 | 2 | 2 | 2 | 2 |
| Stearyl amine |  | 0.3 | 0.3 | 0.3 | 0.3 | 0.3 | 0.3 | 0.3 | 0.3 |
| Dioctyl amine |  |  |  |  |  |  |  |  |  |
| Diphenyl amine |  |  |  |  |  |  |  |  |  |
| 4,4'-diaminodiphenylsulfide |  | 0.5 |  |  |  |  |  |  |  |
| 1,3-bis(4-aminophenoxy)benzene |  |  | 1.0 |  |  |  |  |  |  |
| 1,4-bis(4-aminophenoxy)benzene |  |  |  | 1.0 |  |  |  |  |  |
| 2,2-bis[4-(4-aminophenoxy)phenyl]propane |  |  |  |  | 1.5 |  |  |  | 0.5 |
| 3,4'-diaminophenyl ether |  |  |  |  |  | 0.7 |  |  |  |
| 4,4'-diaminophenyl ether |  |  |  |  |  |  | 0.3 |  |  |
| Bis[4-(3-aminophenoxy)phenyl]sulfone |  |  |  |  |  |  |  | 1.5 |  |
| Hexamethylenediamine carbamate |  |  |  |  |  |  |  |  |  |
| 4,4'-methylene dianiline |  |  |  |  |  |  |  |  |  |
| Di-o-tolylguanidine |  | 1.5 | 1.5 | 1.5 | 1.5 | 1.5 | 1.5 | 1.5 | 1.5 |
| Processability |  | Excellent | Excellent | Excellent | Excellent | Excellent | Excellent | Excellent | Excellent |
| Scorch time (t5) | min | 20 | 12 | 11 | 11 | 19 | 12 | 19 | 16 |
| Physical properties |  |  |  |  |  |  |  |  |  |
| Vulcanization conditions |  |  |  |  |  |  |  |  |  |
| Press vulcanization: |  |  |  |  |  |  |  |  |  |
| 10 min. 170° C. |  |  |  |  |  |  |  |  |  |
| Secondary vulcanization: |  |  |  |  |  |  |  |  |  |
| 4 hrs 170° C. |  |  |  |  |  |  |  |  |  |
| Tensile strength | MPa | 12 | 12 | 12 | 13 | 12 | 10 | 13 | 13 |
| Elongation | % | 360 | 210 | 210 | 190 | 250 | 320 | 260 | 200 |
| Hardness |  | 65 | 67 | 67 | 68 | 68 | 62 | 68 | 66 |
| Compression set | % | 11 | 13 | 11 | 11 | 12 | 13 | 14 | 10 |

|  | Example No. | | | | | | | |
| --- | --- | --- | --- | --- | --- | --- | --- | --- |
|  | 9 | 10 | 11 | 12 | 13 | 14 | 15 | 16 |
| Blending components |  |  |  |  |  |  |  |  |
| Polymer A | 100 | 100 | 100 | 100 | 100 | 100 |  |  |
| Polymer B |  |  |  |  |  |  | 100 |  |
| Polymer C |  |  |  |  |  |  |  | 100 |
| Stearic acid | 1 | 1 | 1 | 1 | 1 | 1 | 1 | 1 |
| Anti-aging agent CD | 1 | 1 | 1 | 1 | 1 | 1 | 1 | 1 |
| MAF carbon | 50 | 50 | 50 | 50 | 50 | 50 | 50 | 50 |
| Liquid paraffin | 1 | 1 | 1 | 1 | 1 | 1 | 1 | 1 |
| Paranwax 135F | 2 | 2 | 2 | 2 | 2 | 2 | 2 | 2 |
| Stearyl amine | 0.3 | 0.3 | 0.3 | 0.6 |  |  | 0.3 | 0.3 |
| Dioctyl amine |  |  |  |  | 0.6 |  |  |  |
| Diphenyl amine |  |  |  |  |  | 0.6 |  |  |
| 4,4'-diaminodiphenylsulfide |  |  |  |  |  |  |  |  |
| 1,3-bis(4-aminophenoxy)benzene |  |  |  |  |  |  |  |  |
| 1,4-bis(4-aminophenoxy)benzene |  |  |  |  |  |  |  |  |
| 2,2-bis[4-(4-aminophenoxy)phenyl]propane | 2.5 | 1.5 | 1.5 | 1.0 | 1.0 | 1.0 | 3.0 | 1.0 |
| 3,4'-diaminophenyl ether |  |  |  |  |  |  |  |  |
| 4,4'-diaminophenyl ether |  |  |  |  |  |  |  |  |
| Bis[4-(3-aminophenoxy)phenyl]sulfone |  |  |  |  |  |  |  |  |
| Hexamethylenediamine carbamate |  |  |  |  |  |  |  |  |
| 4,4'-methylene dianiline |  |  |  |  |  |  |  |  |

TABLE 1-continued

| | | | | | | | | | |
|---|---|---|---|---|---|---|---|---|---|
| Di-o-tolylguanidine | | 1.5 | 1.0 | 2.0 | 1.0 | 1.0 | 1.0 | 3.0 | 1.0 |
| Processability | | Excellent | Excellent | Excellent | Excellent | Good | Good | Excellent | Excellent |
| Scorch time (t5) | min | 12 | 11 | 13 | 22 | 15 | 14 | 15 | 11 |
| Physical properties | | | | | | | | | |
| Vulcanization conditions | | | | | | | | | |
| Press vulcanization: | | | | | | | | | |
| 10 min. 170° C. | | | | | | | | | |
| Secondary vulcanization: | | | | | | | | | |
| 4 hrs 170° C. | | | | | | | | | |
| Tensile strength | MPa | 12 | 9 | 13 | 11 | 11 | 10 | 14 | 10 |
| Elongation | % | 200 | 370 | 160 | 220 | 200 | 200 | 280 | 230 |
| Hardness | | 67 | 57 | 71 | 69 | 69 | 68 | 77 | 58 |
| Compression set | % | 10 | 11 | 12 | 12 | 11 | 11 | 10 | 9 |

TABLE 2

| | | Comparative Example No. | | | | | | |
|---|---|---|---|---|---|---|---|---|
| | | 1 | 2 | 3 | 4 | 5 | 6 | 7 |
| Blending components | | | | | | | | |
| Polymer A | | 100 | 100 | 100 | 100 | 100 | | |
| Polymer B | | | | | | | 100 | |
| Polymer C | | | | | | | | 100 |
| Stearic acid | | 1 | 1 | 1 | 1 | 1 | 1 | 1 |
| Anti-aging agent CD | | 1 | 1 | 1 | 1 | 1 | 1 | 1 |
| MAF carbon | | 50 | 50 | 50 | 50 | 50 | 50 | 50 |
| Liquid paraffin | | 1 | 1 | 1 | 1 | 1 | 1 | 1 |
| Paraffin wax 135F | | 2 | 2 | 2 | 2 | 2 | 2 | 2 |
| Stearyl amine | | | | | | 0.3 | 0.3 | 0.3 |
| Dioctyl amine | | | | | | | | |
| Diphenyl amine | | | | | | | | |
| 4,4'-diaminodiphenylsulfide | | | | | | | | |
| 1,3-bis(4-aminophenoxy)benzene | | | | | | | | |
| 1,4-bis(4-aminophenoxy)benzene | | | | | | | | |
| 2,2-bis[4-(4-aminophenoxy)phenyl]propane | | 1.5 | | | | | | |
| 3,4'-diaminophenyl ether | | | | | | | | |
| 4,4'-diaminophenyl ether | | | 0.3 | | | | | |
| Bis[4-(3-aminophenoxy)phenyl]sulfone | | | | | | | | |
| Hexamethylenediamine carbamate | | | | 0.6 | | 0.6 | 1.5 | 0.6 |
| 4,4'-methylene dianiline | | | | | 0.5 | | | |
| Di-o-tolylguanidine | | 1.5 | 1.5 | 1.5 | 1.5 | 1.5 | 4.0 | 1.5 |
| Processability | | Poor | Poor | Poor | Poor | Excellent | Excellent | Excellent |
| Scorch time (t5) | min | 9 | 9 | 5 | 11 | 5 | 6 | 4 |
| Physical properties | | | | | | | | |
| Vulcanization conditions | | | | | | | | |
| Press vulcanization: | | | | | | | | |
| 10 min. 170° C. | | | | | | | | |
| Secondary vulcanization: | | | | | | | | |
| 4 hrs 170° C. | | | | | | | | |
| Tensile strength | MPa | 11 | 9 | 12 | 12 | 13 | 18 | 12 |
| Elongation | % | 180 | 290 | 230 | 270 | 250 | 330 | 210 |
| Hardness | | 67 | 60 | 62 | 64 | 65 | 70 | 59 |
| Compression set | % | 13 | 19 | 11 | 13 | 12 | 12 | 12 |

An anti-aging CD used in Tables 1 and 2 was "Nocrac CD" manufactured by Ouchishinko Chemical Industrial Co., Ltd., and MAF is "Seast 116" manufactured by Tokai Carbon Co., Ltd.

INDUSTRIAL APPLICABILITY

As evident from comparison between Examples and Comparative Examples, a vulcanized product comprising an ethylene-acrylic copolymer rubber and its composition of the present invention has excellent rubber physical properties and is also excellent in a balance between processing stability and compression set.

The entire disclosures of Japanese Patent Application No. 2001-332121 filed on Oct. 30, 2001 and Japanese Patent Application No. 2002-216624 filed on Jul. 25, 2002 including specifications, claims and summaries are incorporated herein by reference in their entireties.

The invention claimed is:

1. An ethylene-acrylic copolymer rubber composition, which comprises:
   (A) a carboxyl group-containing ethylene-acrylic copolymer rubber that contains from 0.1 to 30 wt % of a carboxylic group-containing monomer, and a vulcanizing system consisting of (B) at least one monoamine compound selected from the group consisting of a primary amine, a secondary amine and a tertiary amine, (C) a guanidine type compound, and (D) at least one aromatic diamine compound expressed by the following formula (1):

$H_2N—Ph—M—Ph—NH_2$          (1)

wherein M is O, S, $SO_2$, CONH or O—R—O in which R is Ph, Ph—Ph, Ph—$SO_2$—Ph, $(CH_2)_m$, $(CH_2)C(CH_3)_2(CH_2)$, or Ph—$C(CX_3)_2$—Ph, and m=3–5, X=H or F and Ph is a benzene ring.

2. The ethylene-acrylic copolymer rubber composition according to claim 1, wherein the monoamine compound is present in the composition in an amount ranging from 0.001 to 10 weight parts to 100 weight parts of the ethylene-acrylic copolymer rubber.

3. The ethylene-acrylic copolymer rubber composition according to claim 1, wherein the guanidine type compound is present in the compositionin an amount ranging from 0.001 to 10 weight parts to 100 weight parts of the ethylene-acrylic copolymer rubber.

4. The ethylene-acrylic copolymer rubber composition according to claim 1, wherein the aromatic diamine compound is present in the composition in an amount ranging from 0.001 to 10 weight parts to 100 weight parts of the ethylene-acrylic copolymer rubber.

5. The ethylene-acrylic copolymer rubber composition according to claim 1, wherein the aromatic diamine compound is at least one selected from the group consisting of 4,4'-bis(4-aminophenoxy)biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 4,4'-diaminodiphenylsulfone, bis[4-(3-aminophenoxy)phenyl]sulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide and bis[4-(4-aminophenoxy)phenyl]sulfone.

6. The ethylene-acrylic copolymer rubber composition according to claim 1, wherein the monoamine compound is a primary amine or a secondary amine.

7. The ethylene-acrylic copolymer rubber composition according to claim 1, wherein the guanidine compound is di-O-tolylguanidine.

8. A vulcanized product obtained by vulcanizing the ethylene-acrylic copolymer rubber composition as defined in claim 1.

9. A rubber hose comprising the vulcanized product as defined in claim 8.

10. A rubber sealing article comprising the vulcanized product as defined in claim 8.

11. A rubber vibration insulator comprising the vulcanized product as defined in claim 8.

12. The ethylene-acrylic copolymer rubber composition according to claim 1, wherein another rubber material selected from the group consisting of natural rubber, IIR, BR, NBR, HNBR, CR, EPDM, FKM, Q, CSM, CO, ECO and CM is mixed with the acrylic rubber component.

13. The ethylene-acrylic copolymer rubber composition according to claim 1, wherein the unsaturated carboxylic acid component of the ethylene-acrylic copolymer rubber is at least one monomer selected from the consisting of an unsaturated carboxylic acid, an aliphatic unsaturated dicarboxylic acid and an aliphatic unsaturated dicarboxylic acid monoester.

14. The ethylene-acrylic copolymer rubber composition according to claim 1, wherein the monoamine component (B) is primary amine compound selected from the group consisting of methylamine, ethylamine, propylamine, butylamine, pentylamine, hexylamine, heptylamine, octylamine, nonylamine, decylamine, undecylamine, dodecylamine, tetradecylamine, hexadodecylamine, stearylamine, octadecylamine, eicosylamine, methanolamine, ethanolamine, aniline, cyclohexylamine, benzylamine, 2-aminotoluene, 3-aminotoluene, 4-aminotoluene, 2,4-dimethylaniline, 2,3-dimethylaniline, 2,5-dimethylaniline, 2,6-dimethylaniline, 3,4-dimethylaniline, 3,5-dimethylaniline, 2,4,5-trimethylaniline, 2,4,6-trimethylaniline, 3,4,5,6-tetramethylaniline, 2,4,5,6-tetramethylaniline, 2,3,5,6-tetramethylaniline, 2-ethyl-3-hexylaniline, 2-ethyl-4-hexylaniline, 2-ethyl-5-hexylaniline, 2-ethyl-6-hexylaniline, 3-ethyl-4-hexylaniline, 3-ethyl-5-hexylaniline, 3-ethyl-2-hexylaniline, 4-ethyl-2-hexylaniline, 5-ethyl-2-hexylaniline, 6-ethyl-2-hexylaniline, 4-ethyl-3-hexylaniline, 5-ethyl-3-hexylaniline, 3,4,6-triethyltoluene, 2-methoxyaniline, 3-methoxyaniline, 4-methoxyaniline, 2-methoxy-3-methylaniline, 2-methoxy-4-methylaniline, 2-methoxy-5-methylaniline, 2-methoxy-6-methylaniline, 3-methoxy-2-methylaniline, 3-methoxy-4-methylaniline, 3-methoxy-5-methylaniline, 3-methoxy-6-methylaniline, 4-methoxy-2-methylaniline, 4-methoxy-3-methylaniline, 2-ethoxyaniline, 3-ethoxyaniline, 4-ethoxyaniline, 4-methoxy-5-methylaniline, 4-methoxy-6-methylaniline, 2-methoxy-3-ethylaniline, 2-methoxy-4-ethylaniline, 2-methoxy-5-ethylaniline, 2-methoxy-6-ethylaniline, 3-methoxy-2-ethylaniline, 3-methoxy-4-ethylaniline, 3-methoxy-5-ethylaniline, 3-methoxy-6-ethylaniline, 4-methoxy-2-ethylaniline, 4-methoxy-3-ethylaniline, 2-methoxy-2,3,4-trimethylaniline, 3-methoxy-2,4,5-trimethylaniline, 4-methoxy-2,3,5-trimethylaniline, bis(2-cyanoethyl)amine; a secondary amine compound selected from the group consisting of dimethylamine, diethylamine, dipropylamine, dibutylamine, dipentylamine, dihexylamine, diheptylamine, dioctylamine, dinonylamine, didecylamine, diundecylamine, didodecylamine, ditetradecylamine, dihexadecylamine, dimethanolamine, diethanolamine, diphenylamine, dicyclohexylamine, nitrosodimethylamine and nitrosodiphenylamine; or a tertiary amine compound selected from the group consisting of trimethylamine, triethylamine, tripropylamine, tributylamine, tripentylamine, trihexylamine, triheptylamine, trioctylamine, trinonylamine, tridecylamine, triundecylamine, tridodecylamine, tritetradecylamine, trihexadodecylamine, tristearylamine, trioctadecylamine, trieicosylamine, trimethanolamine, triethanolamine, triphenylamine and tricyclohexylamine.

15. The ethylene-acrylic copolymer rubber composition according to claim 1, wherein the ethylene monomer unit component of the ethylene-acrylic copolymer rubber is an alkyl vinyl ketone, an alkyl vinyl ether, alkyl allyl ether, a vinyl aromatic compound, a vinylnitrile, an ethylenic unsaturated compound, vinyl acetate, ethylene, propylene, butadiene, isoprene, pentadiene, vinyl chloride, vinylidene chloride, vinyl fluoride, vinylidene fluoride, vinyl propionate or an alkyl fumarate.

16. The ethylene-acrylic copolymer rubber composition according to claim 15, wherein the alkyl vinyl ketone is methyl vinyl ketone, said alkyl vinyl ether is vinyl ethyl ether, said allyl alkyl ether is allyl methyl ether, said vinyl aromatic compound is styrene, α-methylstyrene, chlorostyrene, vinyltoluene or vinylnaphthalene and said vinylnitrile is acrylonitrile or methacrylonitrile.

17. An ethylene-acrylic copolymer rubber composition, which consists essentially of:
(A) a carboxyl group-containing ethylene-acrylic copolymer rubber that contains from 0.1 to 30 wt % of a carboxylic group-containing monomer, (B) at least one monoamine compound selected from the group consisting of a primary amine, a secondary amine and a tertiary amine, (C) a guanidine type compound, and (D) at least one aromatic diamine compound expressed by the following formula (1):

(1)

wherein M is O, S, $SO_2$, CONH or O—R—O in which R is Ph, Ph—Ph, Ph—$SO_2$—Ph, $(CH_2)_m$, $(CH_2)C(CH_3)_2(CH_2)$, or Ph—$C(CX_3)_2$—Ph, and m=3–5, X=H or F and Ph is a benzene ring.

18. The ethylene-acrylic copolymer rubber composition according to claim 1, wherein the composition comprises from 30 to 100 parts by weight of at least one additive selected from the group consisting of a plasticizer, a filler, an anti-aging agent, a stabilizer, a lubricant and a reinforcing agent.

19. An ethylene-acrylic copolymer rubber composition, which comprises:

(A) a carboxyl group-containing ethylene-acrylic copolymer rubber that contains from 0.1 to 30 wt % of a carboxylic group-containing monomer, and a vulcanizing system consisting of (B) at least one monoamine compound selected from the group consisting of a primary amine and a secondary amine, (C) a guanidine type compound, and (D) at least one aromatic diamine compound expressed by the following formula (1):

(1)

wherein M is O, S, $SO_2$, CONH or O—R—O in which R is Ph, Ph—Ph, Ph—$SO_2$—Ph, $(CH_2)_m$, $(CH_2)C(CH_3)_2(CH_2)$, or Ph—$C(CX_3)_2$—Ph, and m=3–5, X=H or F and Ph is a benzene ring.

* * * * *